No. 883,010. PATENTED MAR. 24, 1908.
A. E. GLASCOCK.
TRACTION WHEEL.
APPLICATION FILED MAR. 8, 1907.
3 SHEETS—SHEET 3.
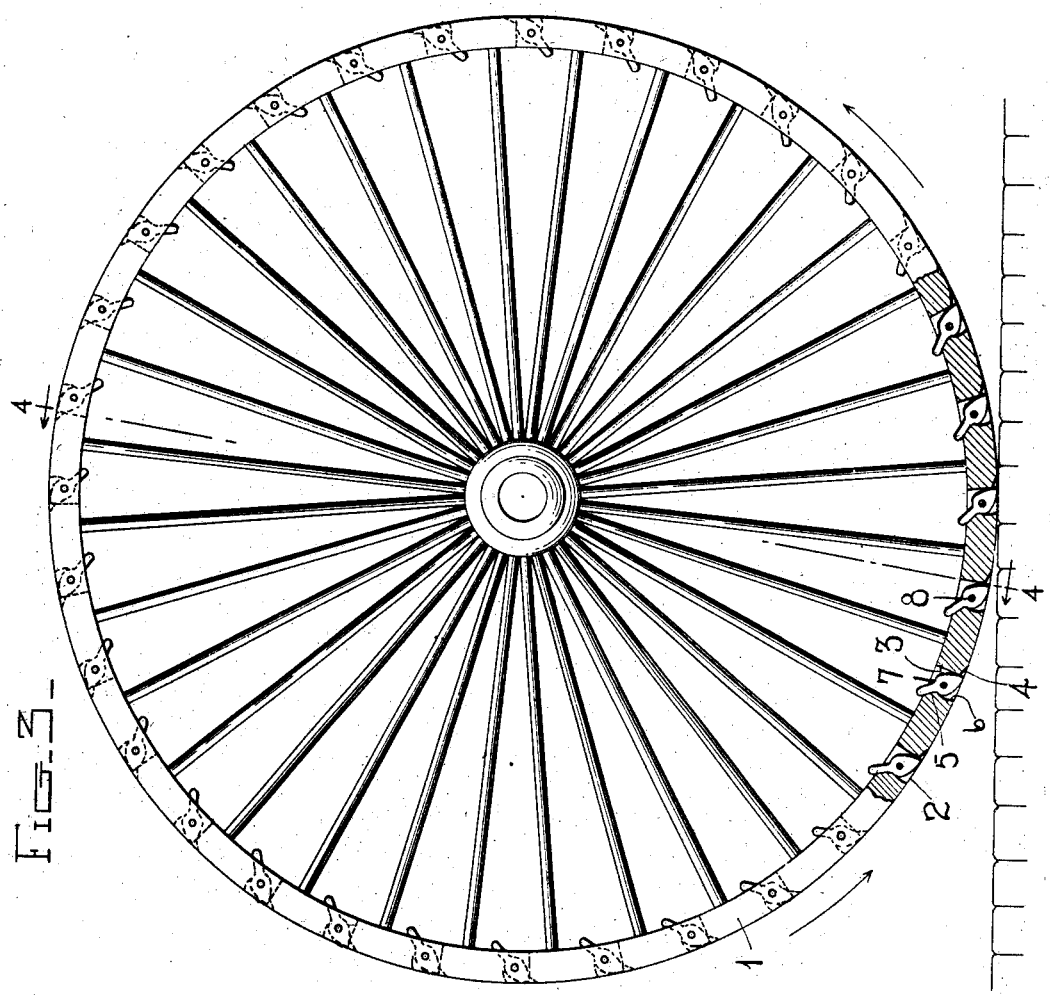
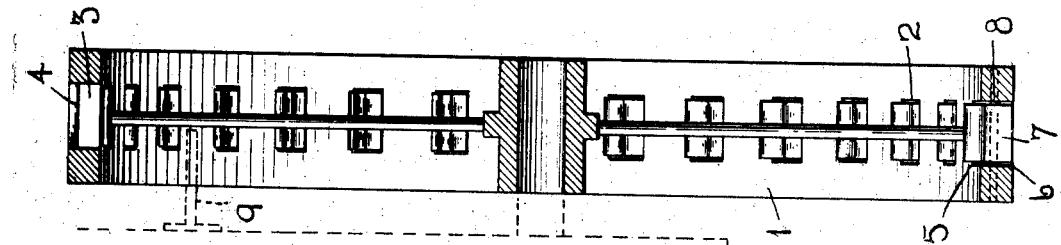
Witnesses
L. B. James
Inventor
Alfred E. Glascock
By
Wm. D. Hodges
Attorney

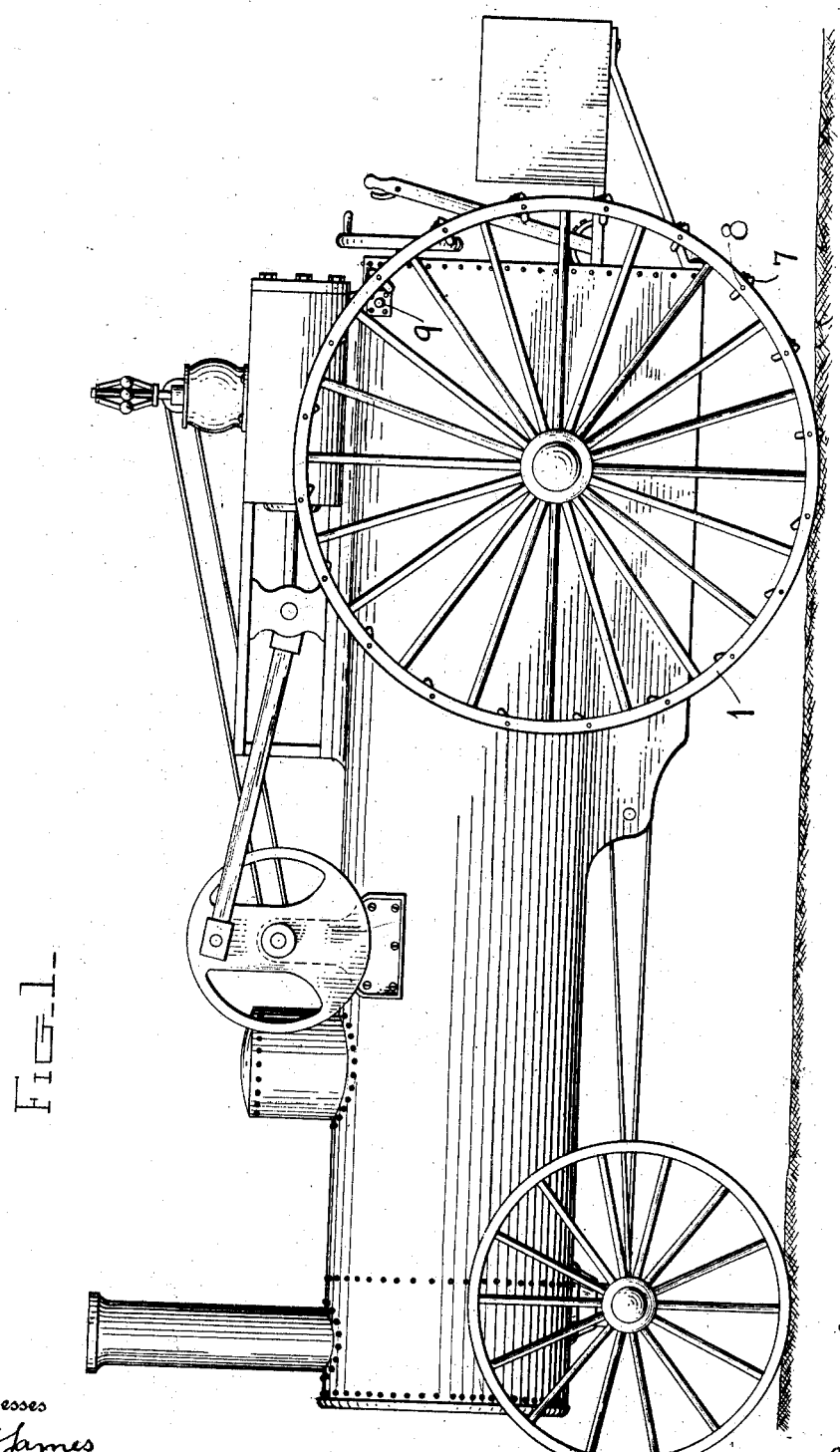

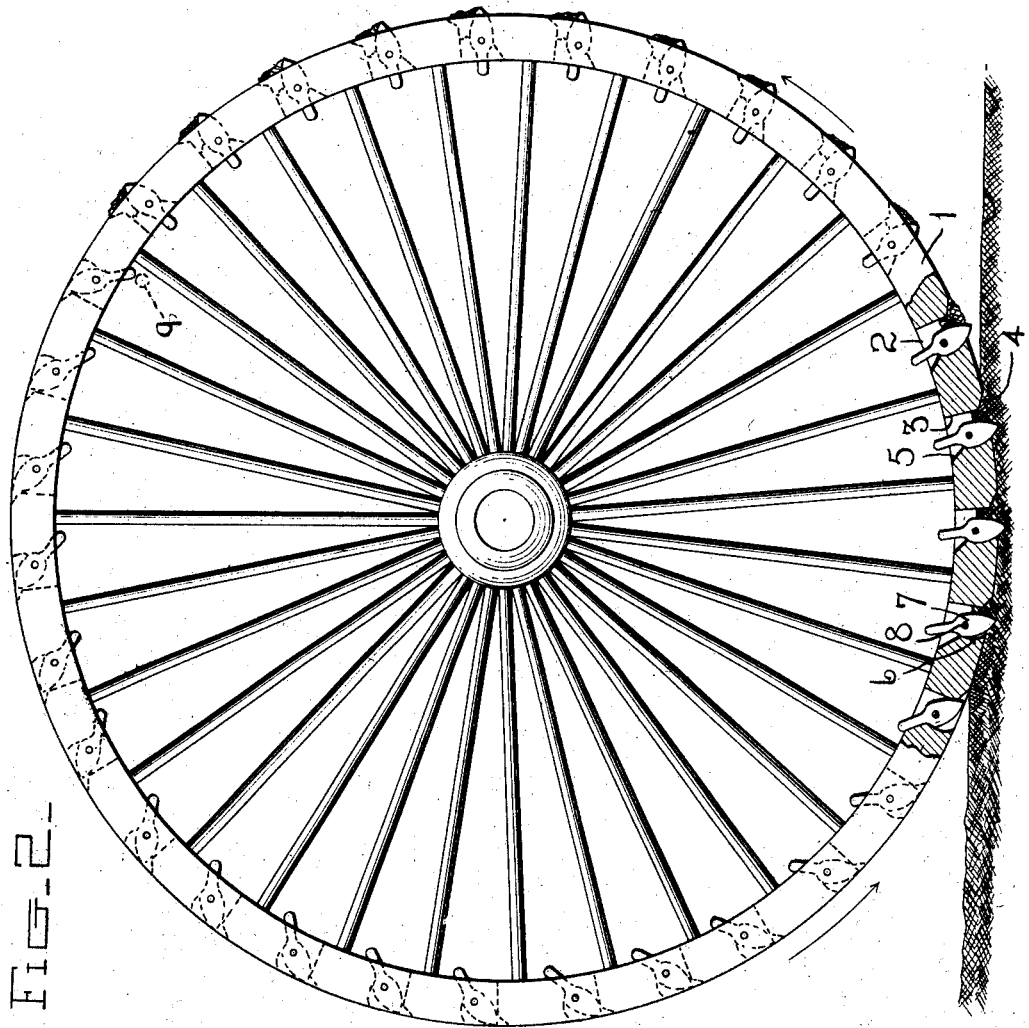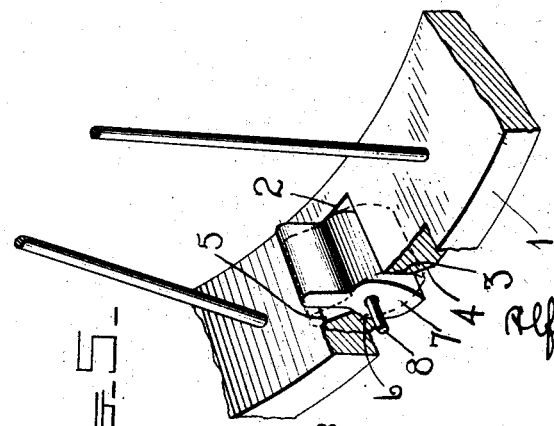

UNITED STATES PATENT OFFICE.

ALFRED E. GLASCOCK, OF WASHINGTON, DISTRICT OF COLUMBIA, ASSIGNOR, BY MESNE ASSIGNMENTS, TO FARM MOTOR COMPANY, A CORPORATION OF SOUTH DAKOTA.

TRACTION-WHEEL.

No. 883,010.      Specification of Letters Patent.      Patented March 24, 1908.

Application filed March 8, 1907. Serial No. 361,369.

*To all whom it may concern:*

Be it known that I, ALFRED E. GLASCOCK, a citizen of the United States, residing at Washington, in the District of Columbia, have invented certain new and useful Improvements in Traction-Wheels, of which the following is a specification.

This invention has relation to traction or driving wheels used upon traction engines and the like; and it consists in the novel construction and arrangement of its parts as hereinafter shown and described.

The object of the invention is to provide a wheel of the character stated with a series of tractors which are so mounted upon the wheel rim as to be automatically forced out beyond the rim of the wheel should the said wheel slip or spin in soft earth, mud or sand. Normally the said tractors lie within the rim of the wheel while the vehicle is in motion, and being so positioned when the wheel is passing over hard roads, pavements or bridges, they can do no damage to the surface of such highways. Provision is made for returning the said tractors to the interior of the wheel rim at each revolution thereof, thus the said tractors cannot at any time remain in extended position with relation to the wheel rim, and can assume such position only as a consequence of slipping or spinning of the wheel, which slipping or spinning can occur only in soft earth, mud or sand.

In the past numerous attempts have been made to provide traction wheels with effective and unobjectionable movable tractors, but for the greater part such devices have been unsatisfactory, inasmuch as they all depend upon a lever or other manually operated means for moving the tractors with relation to the wheel rim. When such constructions are relied upon they require the attention of an operator, or if neglected by the operator may be the source of damage both to the engine and roadway to no inconsiderable degree. If through oversight or neglect such tractors are permitted to remain extended with relation to the wheel rim while the engine is passing over a hard road or a smooth surfaced street, bridges, etc., the said tractors will mutilate the surface of the thoroughfare, and as each tractor comes in contact with the said surface the engine must partially or entirely lift itself bodily over the tractor which operates as a chock and necessarily impedes the speed of the engine and subjects the same to unnecessary jarring and jolting and damage to the machinery incidental thereto. Furthermore in order to project the tractors much energy must be expended for unless the traction wheel is in very soft mud the engine must be at least partially lifted in order to have the tractors extend to their greatest degree.

In my present invention all of these objections are effectually overcome, as the tractors require no attention on the part of an operator, as they normally lie within the wheel rim while the vehicle is moving and consequently the engine may be run over hard surfaces with impunity, and without damage to either engine or road. As they are automatically extended only as a consequence of slipping or spinning of the wheel, which can only occur in soft ground as above pointed out, they are projected by the energy of the engine, which energy is usually wasted, and they therefore do not call for such laborious manual exertion in order to be extended, as movable tractors have heretofore required.

In the accompanying drawings:—Figure 1 is a side elevation of an engine provided with the traction wheel. Fig. 2, is a side elevation of the wheel partly in section showing the tractors extended at the lower portion thereof. Fig. 3, is a side elevation of the wheel partly in section showing all of the tractors withdrawn. Fig. 4, is a transverse sectional view of the wheel cut on the line 4—4 of Fig. 3; and Fig. 5, is a detail perspective view of a section of the wheel rim showing one of the tractors pivoted in the perforation thereof.

The traction wheel comprises the rim 1, which is provided at suitable intervals with the perforations 2. The said perforations are provided with the straight and radially disposed rear walls 3, and the inclined ducts 4 leading into the outer ends thereof. The opposite front wall is provided with the upper or inner inclined surface 5, and the outer arcuate surface 6. The tractors 7 are panduriform in edge elevation, and are pivoted in the said perforations. The pivot pins 8 pass through the said tractors at their points of greatest breadth, and the said tractors in length are greater than the breadth of the wheel rim 7. As the pivot pins pass through the tractors at intermediate points, the said tractors are so positioned that their inner ends are heavier than their outer ends. When the wheel is rotating, the centrifugal force tends to throw the heavier inner ends of the tractors outward, and this movement will cause said inner ends to normally lie against the inclined surfaces 5, and the lower or outer pointed ends of the tractors will be flush with the outer ends of the ducts 4. When the tractors are substantially radially disposed with relation to the wheel, their lower ends will be below the lower side of the wheel and the front sides of the lower or outer portions of the tractors will be against the arcuate surfaces 6. By reason of the peculiar configuration and the positioning of the tractors in the said perforations, they will normally lie with their lower ends flush or within the wheel rim, and thus the wheel may pass over smooth surfaces without injuring the same. When, however, the wheel enters soft earth or mud, the said earth or mud will pass up through the ducts 4 and against the rear sides of the outer ends of the tractors. If at such time the wheel should slip or spin greater quantities of the earth or mud are forced into the ducts 4 and as a consequence the tractors in engagement with the ground will be swung upon their pivots into substantially radial positions and the extended tractors will offer sufficient resistance to the earth to check the spinning of the wheel and preserve the energy of the engine for propelling the same. The pin 9 is fixed to a stationary point at the side of the engine and has its end lying in the path of the inner ends of the said tractors when the same are extended, and consequently as the said tractor ends come in contact with the said pin they are swung back into their normal positions in the wheel rim, and the mud which has previously entered the perforations through the ducts 4 is forced through the said perforations and falls to the ground.

Having described my invention, what I claim as new and desire to secure by Letters Patent is:—

1. A traction wheel a tractor pivotally mounted in said wheel and adapted to project beyond the rim thereof, said tractor being held normally retracted by the centrifugal force developed in the rotation of the wheel, and a fixed means for positively withdrawing the tractor when projected, at each revolution of the wheel.

2. A traction wheel, a tractor mounted thereon and adapted to be normally retracted within the rim of the wheel by the centrifugal force developed in the rotation thereof, and means whereby earth will be forced between the tractor and said rim by the spinning of said wheel.

3. A traction wheel, a tractor mounted in the rim thereof and free to swing under the influence of the centrifugal force developed in the rotation of said wheel, and means whereby earth will be forced between said tractor and said rim by the spinning of said wheel.

4. A traction wheel having a rim provided with perforations each having an inclined duct and a panduriform tractor movably mounted in each perforation.

5. A traction wheel having a rim provided with perforations each having an inclined duct and a panduriform tractor pivotally mounted in each perforation.

6. A traction wheel having a rim provided with perforations each having an inclined duct, and a tractor pivoted in each perforation and free to swing under the centrifugal force developed in the rotation of said wheel.

7. A traction wheel provided with a perforated rim having a duct leading into the perforation, and a tractor pivoted in said perforation and free to swing under the influence of the centrifugal force developed in the rotation of said wheel.

8. A traction wheel provided with a perforated rim having a duct leading into the perforation at the rear edge of the latter, and a tractor pivoted in said perforation and free to swing under the influence of the centrifugal force developed in the rotation of said wheel.

9. A traction wheel having a rim provided with perforations each having an inclined duct, and a tractor pivoted at a point between its ends within each perforation.

10. A traction wheel having a rim provided with perforations each having an inclined duct, and a panduriform tractor pivoted at a point between its ends within each perforation.

11. A traction wheel having a perforated rim and a panduriform tractor pivoted in the perforation at a point in alinement with its greatest transverse thickness.

12. A traction wheel having a rim provided with a perforation having an inclined duct, an extensible tractor located in said perforation and bearing against one portion of the forward edge of the perforation when extended and another portion thereof when withdrawn.

13. A traction wheel having a perforated rim, an extensible tractor located in the perforation and bearing against the lower portion of the forward edge of the perforation when extended and the upper portion thereof when withdrawn.

14. A traction wheel having a rim provided with a perforation having an inclined duct, a tractor pivoted in said perforation and bearing against one portion of the forward edge of the perforation when extended and another portion thereof when withdrawn 15. A traction wheel having a perforated rim, a tractor pivoted in the perforation and bearing against the lower portion of the forward edge of the perforation when extended and the upper portion thereof when withdrawn.

16. A traction wheel having a perforated rim with a duct leading into the perforation, and a tractor pivoted in said perforation and normally bearing against the side thereof opposite said duct, under the influence of the centrifugal force developed in the rotation of said wheel.

17. A traction wheel having in its rim a perforation provided at one edge with a curved surface and an inclined surface, a tractor pivoted in said perforation and adapted to engage each of said surfaces when in extended and withdrawn positions.

18. A traction wheel having in its rim a perforation provided at one edge with a curved surface and an inclined surface, and at its opposite edge a duct, a tractor pivoted in said perforation and adapted to engage each of said surfaces when in extended and withdrawn positions.

19. A traction wheel having in its rim a perforation provided at one edge with a curved surface and an inclined surface, a panduriform tractor pivoted in said perforation and adapted to engage each of said surfaces when in extended and withdrawn positions.

20. A traction wheel having in its rim a perforation provided at one edge with a curved surface and an inclined surface, and at its opposite edge a duct, a panduriform tractor pivoted in said perforation and adapted to engage each of said surfaces when in extended and withdrawn positions.

21. A traction wheel having a perforated rim with a duct leading into the perforation, a panduriform tractor pivoted in said perforation and bearing against the side thereof opposite the said duct.

In testimony whereof I affix my signature, in presence of two witnesses.

ALFRED E. GLASCOCK.

Witnesses:
  Wm. L. Stuard,
  B. D. Sullivan.